Patented May 20, 1952

2,597,440

UNITED STATES PATENT OFFICE 2,597,440

STRONGLY BASIC ANION-EXCHANGE RESINS

George W. Bodamer, Cheltenham, Pa., assignor to Rohm & Haas Company, Philadelphia, Pa., a corporation of Delaware No Drawing. Application May 12, 1951,
Serial No. 226,094

7 Claims. (Cl. 260—85.1)

This invention relates to anion-exchange polymers and to their preparation and use. It relates to insoluble anion-exchange resins of the strongly basic quaternary ammonium type which are proliferous polymers and which are characterized by unusually large areas of surface, very high degrees of porosity, high adsorptive capacity, and very rapid rates of adsorption. More specifically, it relates to the preparation and use of polymers which have the chemical properties of strongly basic anion-exchangers and the physical properties of the so-called popcorn or proliferous polymers. As a result of this peculiar combination of chemical and physical properties, these ion-exchange resins have distinct advantages in some applications over the harder and denser, strongly basic anion-exchangers employed heretofore. They are particularly suitable for use in catalysis, in the decolorization of cane sugar, and in selective adsorption, because of their strongly basic characteristics and their high porosity and large surface area.

Other anion-exchange resins of the strongly basic type are well known and are marketed for the deionization of aqueous fluids in general. Such resins as are being currently used are described in C. H. McBurney's application Serial No. 759,308, filed July 5, 1947, now Patent No. 2,591,573, and they are chraacterized by being hard, dense, infusible, insoluble, granular or spheroidal particles. As far as the chemical properties of these known resins and the chemistry of ion-exchange are concerned, the available products are very satisfactory. But the physical properties of these materials—particularly their hard, dense, granular form—limits their utility in many instances where their chemical properties would appear to make them ideally suited as, for example, in the de-ashing and decolorizing of cane sugar syrups.

The products of this invention are all insoluble, proliferous or popcorn polymers. They are water-insoluble, proliferous polymers of styrene, to the aryl nuclei of which are attached quaternary ammonium groups. The ammonium groups are attached to the aromatic nuclei by means of alkylene groups—preferably by methylene groups. These polymers are made, as will be described in greater detail below, by haloalkylating—preferably chloromethylating—an insoluble, proliferous polymer or copolymer of styrene—and then reacting the haloalkylated proliferous product with a tertiary amine such as trimethylamine or dimethylamino ethanol. As a result, the products are insoluble, proliferous polymers which are suitable for the removal of anions from fluids and which comprise the reaction product of a tertiary amine and a haloalkylated proliferous copolymer of a major proportion of styrene and a minor amount of a polyolefinic compound such as divinylbenzene or butadiene, in which the olefinic linkages are in the acyclic portion of the molecule and are the reaction groups which enter into the proliferous copolymerization reaction, the said proliferous copolymer containing at least one haloalkyl group for every fifteen aromatic nuclei—or preferably an average of about 0.2 to 1.5 haloalkyl groups—per aromatic nucleus. As a result, the poliferous products contain on the aromatic nuclei substituent groups having the general formula

in which $n$ is an integer having a value of 1 to 4; $R_1$, $R_2$, and $R_3$ represent monovalent organic radicals; and Y is an anion.

Popcorn polymers of styrene are known. Their formation was first reported by Staudinger and Huseman in their study of the polymers and copolymers of styrene (Berichte, 68, 1618 (1935)). They are also described in U. S. Patents Nos. 2,205,390; 2,290,164; 2,311,615; 2,331,263, and 2,341,175. While mixtures of popcorn polystyrene and normal, glass-like, thermoplastic polystyrene can be molded, the operation is much more difficult than the molding of the thermoplastic polystyrene alone, as indicated in U. S. Patent No. 2,537,951. Aside from molding, the popcorn polymers of styrene apparently had no utility heretofore. The popcorn polymers and copolymers of styrene have a spongy, porous structure and are insoluble in the very solvents which dissolve the homogeneous, thermoplastic, glass-like polymers which are normally produced. In most cases they do look very much like popcorn. They have very high molecular weights and appear to be cross-linked. In the process of forming popcorn polystyrene, the induction period may be long, but soon after a particle of the polymer is formed or is added, the rate of polymerization increases rapidly and the branching, insoluble polymer continues to form until most or all of the monomer is consumed. This is usually referred to as "popping." It is a characteristic of this type of polymerization that the polymer "grows" in much the same way as a salt crystal "grows" when a salt solution is concentrated. If the product is not confined or restrained physically, polymerization proceeds in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer" is particularly apt—and is truly descriptive.

In preparing the proliferous polystyrene from which the products of this invention are made, the most satisfactory method comprises holding a mixture of styrene and an auxiliary polyolefinic popping-agent at a temperature from room temperature (20° C.) to about 80° C., in the presence of a seed of a proliferous polymer, while excluding oxygen.

In general, polymerization progresses more rapidly as the temperature is raised but at temperatures above about 80° C. the proliferous polymer is usually mixed with an objectionable amount of the normal, glass-like polymer and consequently temperatures from about 50° C. to about 70° C. are preferred and recommended.

A wide variety of polyolefinic compounds definitely assist in the formation of the proliferous polystyrene. These auxiliary materials which function as popping-agents or as catalysts for proliferous polymerization are all polyolefinic compounds in which the olefinic linkages are in the acyclic portion of the molecule and are the reactive groups which enter into the proliferous copolymerization reaction. Since this invention is concerned primarily with the manufacture of anion-exchange resins and only indirectly with the many ways in which popcorn polystyrene can be made, it is not intended to be limited or restricted by the particular auxiliary compound or popping-agent which is used to assist in preparing the intermediate popcorn polystyrene. While numerous polyolefinic materials act as popping-agents, examples of some of the best include divinylbenzene, butadiene, isoprene, bimethallyl, biallyl, trivinylbenzene, cyclopentadiene, and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in United States Patents Nos. 2,311,615 and 2,341,175. The auxiliary compounds give every evidence of copolymerizing with the styrene and consequently are present in the final copolymeric products. This is one reason why the polyolefinic hydrocarbons are preferred. It is evident that as the amount of the auxiliary compound is increased the number of styrene nuclei which can be reacted is necessarily reduced. And since the capacity of the final resin for adsorbing anions is proportional to the number of amino groups which are attached to the aromatic nuclei in the product, it is desirable to hold the amount of the copolymerizable auxiliary compound to a minimum. On the other hand, the use of a polyolefinic compound does exert a beneficial effect on the speed of polymerization and on the character and uniformity of the product. The use of as little as 0.5% of an auxiliary compound is evident in the products which obtain. The most satisfactory and suggested amounts, however, are from 2% to 30%, based on the total weight of this compound and the styrene. The use of larger amounts has been studied but there does not appear to be any advantage in exceeding 30%—or even 20%—particularly when the ion-adsorbing capacity of the final product is considered. While all of the auxiliary compounds are alike in having a plurality of non-benzenoid, olefinic linkages or double bonds in their chemical structure, and in facilitating the popping of styrene, it is also true that these compounds differ in degree in regard to the effect they have on the density and porosity of the final copolymer. For example, a material such as divinylbenzene, which is recognized as a particularly fast and efficient cross-linking agent for styrene and vinyl compounds in general, aids very materially in the popping of styrene, but it also gives rise to harder, less porous, popcorn polymers than do many of the other auxiliary agents such as butadiene or isoprene. Consequently the amount, within the limits set forth above, of the auxiliary, copolymerizable compound which is employed is determined by the degree of porosity or extent of surface-area which is desired in the final product.

The use of a seed to promote the proliferous polymerization is desirable but not necessary. The seed can have the same chemical composition as the proliferous polymer which it is desired to make, or it can have a different chemical composition. The most convenient method involves adding a small amount of a previous batch of proliferous polymer to subsequent mixtures of monomeric styrene which are to be popped. Even the small quantities of one batch which may adhere to the walls of the reaction vessel serve to seed subsequent batches. The word "seed" is used herein in the accepted chemical sense and itself indicates that the amount required is small and that the material is insoluble in the reaction mixture. As little as about 0.001%, on a weight basis, is adequate. Of course, when the seed and the polymer being prepared have the same chemical composition, the amount of the seeding material which is employed is immaterial.

Styrene can be made to polymerize proliferously in bulk or in solution or while suspended in an immiscible liquid medium. The advantage in carrying out the polymerization by the suspension technique is that the final product is obtained in the form of discrete particles which adsorb ions unusually rapidly and which, although small, possess the advantageous properties of popcorn polymers, such as porosity, high surface-area, and insolubility.

It appears that free radicals, such as are provided by peroxidic compounds, play a part in the formation of the opaque, proliferous polymers, just as they do in the formation of clear, glass-like polymers. In proliferous polymerization, however, the amounts of the peroxidic compounds, such as benzoyl, lauroyl, and stearoyl peroxides, tert.-butyl hydroperoxide and the inorganic per-salts, which can be tolerated is relatively very low and should not exceed 0.5% on a weight basis because large amounts of such compounds favor the formation of the clear, glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus, it is most desirable to conduct the proliferous polymerization in the substantially complete absence of oxygen.

The proliferous polymers and copolymers of styrene, regardless of their origin or particular method of preparation, are first haloalkylated and then reacted with a tertiary amine. This step of haloalkylating involves introducing into a proliferous polymer a plurality of bromoalkyl or chloroalkyl groups having the general formula $C_nH_{2n}X$, in which $n$ is an integer of value one to four and X represents an atom of chlorine or bromine. While groups containing one to four carbon atoms are embraced by this invention, it is preferred to employ those compounds in which chloromethyl groups, $-CH_2Cl$, are added to the insoluble polymer because the chloromethyl products are by far the most reactive. The carbon atoms in the group $-C_nH_{2n}X$ may be in a straight or a branched chain.

The step of haloalkylating the insoluble hydrocarbon copolymer may be carried out in a variety of ways. For example, the polymer may be reacted with a mixture of an aldehyde and hydrochloric acid or a mixture of a dihalide and a Friedel-Crafts catalyst. Methods of chloroalkylating which may be used for introducing the $-CH_2Cl$ group and which also serve as guides for introducing $-C_2H_4X$, $-C_3H_6X$, $-C_4H_8X$ groups are described in "Organic Reactions," vol. I, chapter 3, page 63 et seq. (John Wiley & Sons, Inc., N. Y. C., 1942).

The extent of the haloalkylation reaction may be conveniently determined by a halogen analysis. It is desirable that as many haloalkyl groups as possible be introduced into the insoluble copolymer because the number of such groups determines the number of quaternary ammonium groups in the final product; and, of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity as to be commercially attractive. The minimum number of such groups should be one for every 15 aromatic hydrocarbon nuclei in the polymer. This, of course, requires that at least one haloalkyl group be first added for every 15 aromatic hydrocarbon nuclei; and in the case of a chloromethylated copolymer of styrene and 1% divinylbenzene such a product would analyze about 2% chlorine. The upper limit is that reached when every available position in the aromatic nuclei is haloalkylated. Satisfactory resins of high capacity can be made in which the number of haloalkyl groups and, hence, the number of quaternary ammonium groups which are introduced is less than the theoretical maximum. Thus, very valuable resins are those made by aminating, with a tertiary amine, copolymers containing from 3 to 6 haloalkyl groups for every four aromatic hydrocarbon nuclei.

The next step in the formation of the anion-exchange resin is the amination of the haloalkylated copolymer with a tertiary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing quaternary ammonium salt groups, is freed of the liquid.

It has been found to be advantageous to swell the haloalkylated polymer prior to its reaction with the tertiary amine. This swelling facilitates the subsequent amination reaction and may be carried out by soaking the polymer in a suitable liquid, the most satisfactory of which are benzene, toluene, ethylene dichloride, trichloroethane, tetrachloroethane and the like.

The tertiary amine is used in the form of the free base. Best results are obtained when the amine is one having the general formula

in which $R_1$, $R_2$, and $R_3$ represent methyl, ethyl, phenyl, benzyl, propynyl, or beta-hydroxyethyl groups typified by trimethylamine, triethylamine, dimethylbenzylamine, dimethylaminoethanol, dimethylaniline, and dimethylaminopropyne. Other amines, such as tributylamine and N-methylmorpholine, are operable also; but the products are somewhat less stable than those made with amines containing the six substituents listed above.

After the amination is complete, the resins are separated from the liquids and are freed of organic liquids by steam-distillation. As ordinarily prepared, the products are in the form of quaternary ammonium salts; but such salts can be readily converted into quaternary ammonium hydroxides by treatment with an aqueous solution of a hydroxide of an alkali metal.

The following examples, in which all parts are by weight, are presented in order that the preparation and properties of the products of this invention may be thoroughly understood and recognized. The examples are not to be taken, however, as limiting this invention.

EXAMPLE 1

This serves to show how styrene can be conveniently converted into proliferous or popcorn polymers in bulk. In all cases a glass tube was half-filled with the styrene mixture to be popped. A small piece—a seed— of a previously prepared proliferous copolymer of approximately 90% styrene, 4.4% divinylbenzene, and 5.6% ethyl styrene was added. The mixtures contained a major portion of styrene and a minor portion of a polyolefinic auxiliary compound, as a popping-agent, which was known to be copolymerizable with the styrene. Nitrogen was bubbled through the mixtures in order to flush oxygen from the tubes and thereafter the tubes were sealed with a foil-lined cap and were placed in a constant-temperature water-bath. The kind and amount of the auxiliary popping-agent which copolymerized proliferously with the styrene are listed below, together with other pertinent data. The percentages are based on the total weight of the copolymerizable mixtures. An induction period as recorded is that length of time during which no visible change takes place in the monomeric mixture and is followed by a period of propagation during which the polymer is formed on the seed by proliferation. Ordinarily, the induction period is several times as long as the period of propagation.

*Table I*

| Polyolefinic Auxiliary Compound | Per Cent Benzoyl Peroxide | Temperature | Induction Period |
| --- | --- | --- | --- |
| 10% Butadiene | 0 | Room Temp | About 8-10 days. |
| Do | 0 | 50° C | About 5-7 days. |
| Do | 0.1 | 65° C | 1-1½ days. |
| 10% Isoprene | 0 | Room Temp | About 10-12 days. |
| 10% Butadiene and 5% Commercial Divinylbenzene.[1] | 0 | Room Temp | About 6-8 days. |
| 5% Commercial Divinylbenzene. | 0 | Room Temp | About 8-10 days. |
| Do | 0 | 100° C | About 16 hours.[2] |

[1] The commercial divinylbenzene contained approximately 44% divinylbenzene and 56% ethylstyrene.
[2] This product was approximately 50% proliferous polymer and 50% glass-like polymer. The two polymers could be separated, however.

EXAMPLE 2

A proliferous copolymer of 90% styrene and 10% butadiene was chloromethylated as follows: 90 parts (0.75 mole) of the copolymer (the first described in Example 1 above) was soaked in 1480 parts of ethylene dichloride for two hours during which time the polymer swelled markedly. To the mixture contained in a 3-necked flask equipped with stirrer, thermometer, and reflux condenser was added 138 parts (1.73 moles) of chloromethyl ether, $CH_2ClOCH_3$, and 63.5 parts (0.475 mole) of anhydrous aluminum chloride. The mixture was stirred at room temperature for 18 hours after which 1500 parts of water was added and the mixture was stirred for two hours. The resin was filtered off and was thoroughly washed with water, after which it was dried in an oven overnight at 65° C. Analysis showed that the product contained 11.7% chlorine and inspection revealed that the chloromethylated material was still in the form of a popcorn or proliferous polymer.

EXAMPLE 3

The chloromethylated proliferous product of Example 2 above was converted into a quaternary ammonium anion-exchange resin as follows: In a 3-necked flask equipped with stirrer, thermometer, and reflux condenser was mixed 90 parts of ethylene dichloride and 41 parts of the dry chloromethylated product of Example 2. The mixture was stirred for an hour during which time the polymer swelled. Then, 300 parts of water was added and the swollen polymer was dispersed therein by means of vigorous agitation. A total of 14.4 parts of dimethylamino ethanol, $(CH_3)_2N-C_2H_4OH$, was added and the mixture was stirred and heated to refluxing temperature, at which point it was held for 2.5 hours. The mixture was then freed of ethylene dichloride by steam distillation. It was filtered and the resin was washed thoroughly with water and then dried in an oven at 65° C. Analysis showed that 80% of the available chloromethyl groups had been aminated. The product had a total anion-exchange capacity of 2.1 milliequivalents per gram and was a typical popcorn polymer.

This product, alone and when mixed with a carboxylic cation-exchange resin, had an unusually high capacity for clarifying and decolorizing sugar solutions. A comparison was made between this resin and a conventional non-proliferous quaternary ammonium anion-exchange resin made according to the process of Examples 2 and 3 above by chloromethylating a glass-like, cross-linked copolymer of 98 parts of styrene, 1 part of divinylbenzene, and about 1.2 parts of ethylstyrene and then aminating the chloromethylated polymer with dimethylamino ethanol.

In this comparison, 30 cc. of each resin was placed in separate glass tubes. In one case a solution of raw cane sugar (25° Brix) and in the other a standard solution of brown sugar was passed through the columns of resins. The decolorizing power of the resins was measured in two ways. First, the total capacity of the resins was measured by passing the sugar solutions through the columns until the effluent had the same degree of color as did a portion of the original solutions when diluted with an equal volume of water. At this point the resins are exhausted and 50% of the color is leaking through. Then also the amount of color-bodies removed was determined by comparing the color of the total amount of effluent with standard diluted samples of the original solutions. Following are the results:

| Resin | Raw Cane | | Brown #13 | |
| --- | --- | --- | --- | --- |
|  | Capacity (g. sugar/cc. resin) | Per Cent Color Removed | Capacity (g. sugar/cc. resin) | Per Cent Color Removed |
| Proliferous Product | 4.3 | 92 | 4.0 | 95 |
| Non-Proliferous Product | 1.0 | 60 | 0.92 | 65 |

EXAMPLE 4

By the procedure of Example 3, 19 parts of a chloromethylated proliferous polymer (prepared by the process set forth in Examples 1 and 2 above) was stirred and reacted with 5.32 parts of trimethylamine for 16 hours. The product was freed of ethylene dichloride by steam distillation and was then filtered, washed, and dried and was found to have a capacity of 2.17 milliequivalents per gram.

The products of this invention are all members of that class of compounds known as strongly basic, quaternary ammonium, anion-exchange resins. As such, they can be used in the form of the hydroxide or in the form of quaternary ammonium salts. Not only are these resins capable of adsorbing free acid from fluids but they are capable of exchanging anions. Thus, the salt form is converted to the hydroxide form by treatment with an excess of solution of a strong base such as sodium or potassium hydroxide or, conversely, the hydroxide form is converted to the salt form by treatment with an excess of a solution of an acid such as hydrochloric acid or of a salt such as sodium chloride.

Weakly basic anion-exchange resins of the proliferous type which are quite different in their behavior can also be made by aminating a haloalkylated proliferous copolymer of styrene by means of a primary or secondary amine according to the process described in my application Serial No. 226,093, filed May 12, 1951.

I claim:

1. A process for preparing solid, water-insoluble, anion-exchange resins which comprises proliferously polymerizing styrene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to at least one chloromethyl group for every fifteen aromatic nuclei in said proliferous polymer, reacting the resultant chloromethylated proliferous polymer with a tertiary amine, and thereafter isolating the resultant anion-exchange resin.

2. A process for preparing solid, water-insoluble, anion-exchange resins which comprises proliferously polymerizing a mixture of (a) styrene and (b) a polyolefinic organic compound of which the olefinic linkages are in the acyclic portion of the molecule and are the reactive groups which enter into the copolymerization reaction, said mixture containing at least 70% styrene, at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to at least one chloromethyl group for every fifteen aromatic nuclei in said proliferous polymer, reacting the resultant chloromethylated proliferous polymer with a tertiary amine, and thereafter isolating the resultant anion-exchange resin.

3. A process for preparing solid, water-insoluble, anion-exchange resins which comprises polymerizing a mixture of (a) 70–99.5% styrene and (b) 0.5–30% divinylbenzene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with trimethylamine, and thereafter isolating the resultant anion-exchange resin.

4. A process for preparing solid, water-insoluble, anion-exchange resins which comprises polymerizing a mixture of (a) 70–99.5% styrene and (b) 0.5–30% butadiene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with trimethylamine, and thereafter isolating the resultant anion-exchange resin.

5. A process for preparing solid, water-insoluble, anion-exchange resins which comprises polymerizing a mixture of (a) 70–99.5% styrene and (b) 0.5–30% isoprene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with trimethylamine, and thereafter isolating the resultant anion-exchange resin.

6. A process for preparing solid, water-insoluble, anion-exchange resins which comprises polymerizing a mixture of (a) 70–99.5% styrene and (b) 0.5–30% divinylbenzene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with dimethylaminoethanol, and thereafter isolating the resultant anion-exchange resin.

7. A process for preparing solid, water-insoluble, anion-exchange resins which comprises polymerizing a mixture of (a) 70–99.5% styrene and (b) 0.5–30% butadiene at a temperature from about 20° C. to about 80° C. in the substantially complete absence of oxygen and in the presence of a seed of a previously prepared proliferous polymer, then chloromethylating the resultant proliferous polymer whereby chloroemthyl groups are attached to the aromatic nuclei in an amount equal to 3 to 6 chloromethyl groups for every four aromatic nuclei in said proliferous polymer, reacting the resultant chloromethylated proliferous polymer with diemthylaminoethanol, and thereafter isolating the resultant anion-exchange resin.

GEORGE W. BODAMER.

REFERENCES CITED

The following references are of record in the file of this patent:

UNITED STATES PATENTS

| Number | Name | Date |
|---|---|---|
| 2,311,615 | Zemba | Feb. 16, 1943 |
| 2,537,951 | Amos | Jan. 16, 1951 |
| 2,559,529 | Bauman | July 3, 1951 |

OTHER REFERENCES

Kharasch, Ind. and Eng. Chem., July 1947, pp. 830–837.

Staudinger, Berichte, vol. 68, pp. 1618–1634 (1935).

Kunin, Ion Exchange Resins (1950) p. 61, John Wiley & Sons, N. Y.